United States Patent
Stancu et al.

(10) Patent No.: US 6,262,896 B1
(45) Date of Patent: Jul. 17, 2001

(54) AUXILIARY POWER CONVERSION FOR AN ELECTRIC VEHICLE USING HIGH FREQUENCY INJECTION INTO A PWM INVERTER

(75) Inventors: Constantin C. Stancu, Anaheim; Silva Hiti, Torrance; James Nagashima, Cerritos, all of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/596,694

(22) Filed: Jun. 19, 2000

(51) Int. Cl.[7] .................................................. H02M 3/335
(52) U.S. Cl. ............................................. 363/17; 318/802
(58) Field of Search ................................. 363/15, 16, 17, 363/98, 132; 318/801, 802, 811

(56) References Cited

U.S. PATENT DOCUMENTS 5,151,641 * 9/1992 Shamoto ............................. 318/762
5,350,994 * 9/1994 Kinoshita et al. ..................... 320/15
6,163,127 12/2000 Patel et al. ............................ 318/700

* cited by examiner

*Primary Examiner*—Peter S. Wong
*Assistant Examiner*—Gary L. Laxton
(74) *Attorney, Agent, or Firm*—Anthony Luke Simon

(57) ABSTRACT

An electric power system for an electric vehicle includes an electric drive motor, a high voltage bus for supplying operating power to energize the drive motor, and an inverter including power switching devices and having an inverter output. The inverter is coupled between the high voltage bus and the electric drive motor and a controller is coupled to the inverter and provides motor control signals and high frequency injection signals to the inverter. An auxiliary power unit is coupled to the inverter output and has a DC output for supplying DC operating power. The auxiliary power unit supplies DC power in response to the high frequency injection signals. The electric drive motor operates in response to the motor control signals and is substantially unaffected by the high frequency injection signals.

2 Claims, 2 Drawing Sheets

AUXILIARY POWER CONVERSION FOR AN ELECTRIC VEHICLE USING HIGH FREQUENCY INJECTION INTO A PWM INVERTER

TECHNICAL FIELD

The present invention relates to power supply systems for lower voltage auxiliary systems on an electric vehicle that use power drawn from a high voltage bus.

BACKGROUND OF THE INVENTION

Electric vehicles, including battery, hybrid, and fuel cell electric vehicles, typically use an inverter in the form of a switch-mode power supply to provide three phase operating power to the vehicle's electric drive motor. The inverter design most commonly used is a pulse width modulated (PWM) voltage source inverter which utilizes power transistors that can supply the high currents needed to satisfy the torque demands required by the vehicle drive motor. The inverter switches power to the motor windings from a high voltage bus of approximately 350–400 Vdc.

In addition to the drive motor used to power the vehicle wheels, an electric vehicle normally includes various auxiliary drive motors to operate a variety of different vehicle systems. Some examples of these auxiliary drive motors include liquid coolant pumps, traction control motors, climate control compressor motors, electronic power steering pumps, as well as other blowers and fans. Although suitable DC motors are commercially available that can operate directly off the 350–400 volt bus, this high voltage operation is generally considered undesirable for various reasons including, for example, reduced motor life due to arcing and other commutation problems. Accordingly, lower voltage motors are sometimes used that can be driven from an intermediate voltage power bus operating at, for example, a fixed 42–48 Vdc. This intermediate voltage supply can be produced using a DC—DC converter that draws operating power from the high voltage bus and develops the fixed DC voltage using conventional DC—DC conversion techniques.

In addition to the intermediate voltage supply, some of the auxiliary power systems utilized on an electric vehicle require a standard vehicle voltage supply of 12 Vdc. This lower voltage bus is typically produced by a separate DC—DC converter that also draws its operating power from the high voltage bus. While providing a more desirable low voltage operation of the various auxiliary vehicle power systems, these 12 and 42 volt dedicated DC—DC converters bring with them a number of inherent disadvantages as well. In particular, each of the DC—DC converters used typically include their own input filter, control circuitry, and power transistors, the last of which requires its own thermal management—usually by way of connecting the converter into the liquid coolant system used for cooling the inverter power transistors. As a result, the DC—DC converters not only take up substantial room in the vehicle power electronics chassis, but also add significantly to the overall vehicle power system cost.

Apart from the use of DC—DC converters operating off the high voltage bus, rotary converters operating off the drive motor are sometimes used to generate the intermediate and lower voltage supplies needed by the vehicle. However, these converters are generally bulky, heavy, and inefficient. Moreover, for rotary converters in the form of an "alternator" that operates off the vehicle heat engine, the converter will not work when the engine is stopped. Where the rotary converter is run off the shaft of an electric motor, a custom design is generally required since most automotive alternators cannot run at the high speeds (8,000–15,000 rpm) of a drive motor.

It is therefore a general object of this invention to provide an electric vehicle power system that eliminates the need for dedicated DC—DC converters to generate the intermediate and/or low voltage supplies utilized for the vehicle's auxiliary power systems.

SUMMARY OF THE INVENTION

In accordance with the present invention there is provided an electric power system which overcomes the above-noted disadvantages of known systems that use dedicated DC—DC converters to provide auxiliary power conversion. The electric power system of the invention includes a high voltage bus, electric drive motor, auxiliary power circuit, and an inverter that draws operating power from the high voltage bus. The inverter includes a controller and power switching devices coupled to the controller, with the power switching devices being connected in circuit to switch power from the high voltage bus to the drive motor via an output of the inverter. The auxiliary power circuit includes an input coupled to the inverter output and a rectifier having a DC output for supplying DC operating power to one or more auxiliary vehicle systems. The controller operates the power switching devices at upper and lower frequencies to provide lower frequency drive power to the drive motor and upper frequency operating power to the auxiliary power circuit. The drive motor is operable to provide rotation in response to the lower frequency drive power and the auxiliary power circuit is operable to convert the upper frequency operating power to a DC voltage that is supplied to the DC output.

This arrangement eliminates the need for one or more dedicated DC—DC converters by using the controller to inject a high frequency drive signal into the inverter's power switching devices, with the auxiliary power circuit then rectifying the outputted high frequency voltage to thereby provide the desired low and/or intermediate DC voltages. The high frequency is chosen to be a suitably high value that it does not substantially affect operation of the motor and the auxiliary power circuit preferably includes a high pass filter to block the lower frequency drive signals used to operate the motor.

In one embodiment, the auxiliary power circuit is connected directly to the inverter output with a power transformer being used to provide galvanic isolation for the auxiliary power circuit and a step down of the high voltage power to the appropriate peak voltage for subsequent rectification into the desired DC voltage. The transformer can have multiple windings to produce different DC voltages in the event more than one lower voltage DC bus is required or desired. In another embodiment, a dual winding drive motor is used with the auxiliary power circuit being connected to the drive motor's secondary winding. This can eliminate the need for a separate power transformer in the auxiliary power circuit.

BRIEF DESCRIPTION OF THE DRAWINGS

Preferred exemplary embodiments of the present invention will hereinafter be described in conjunction with the appended drawings, wherein like designations denote like elements, and.

DESCRIPTION OF THE PREFERRED EMBODIMENTS

Figure 1:
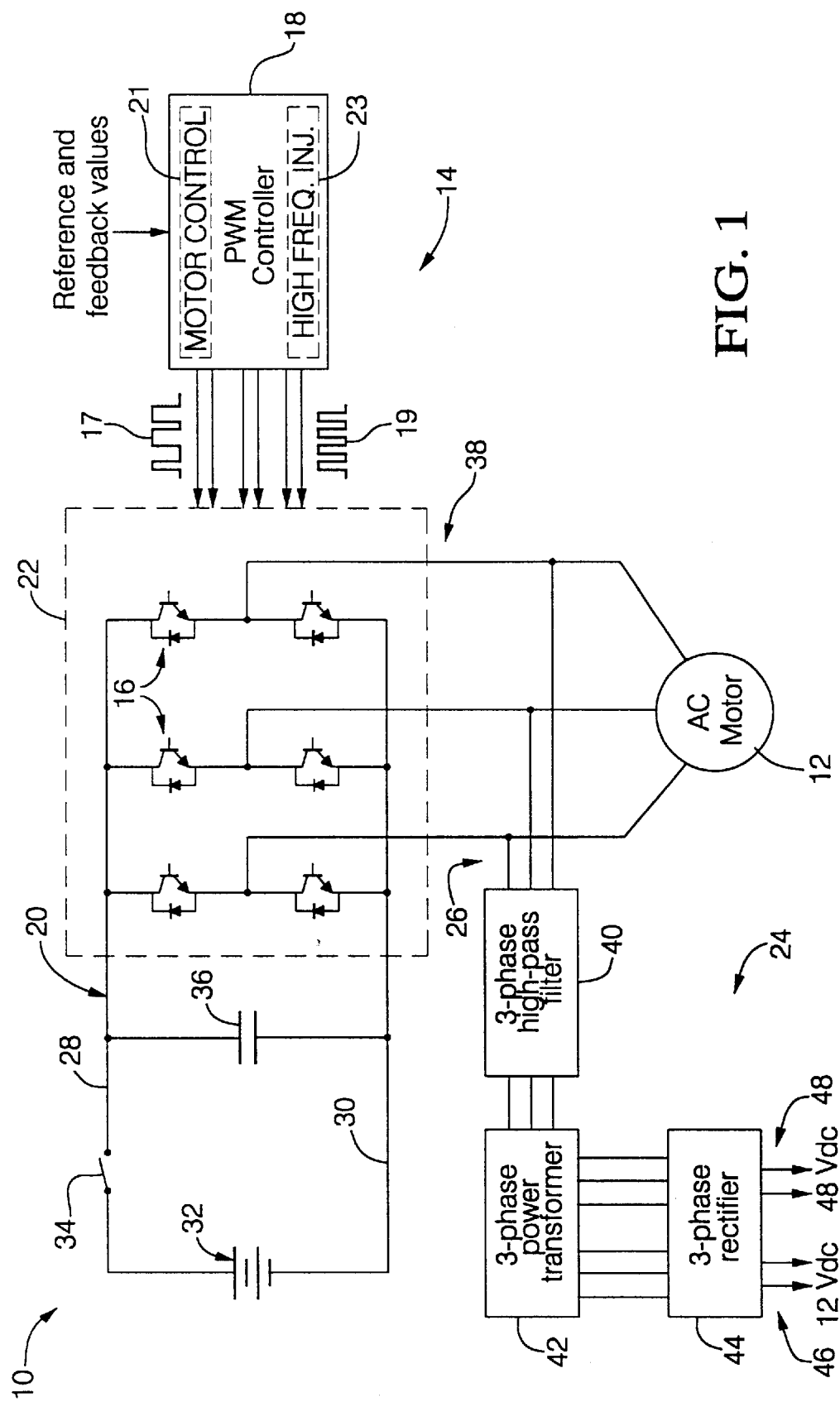
FIG. 1 is a block diagram of a first embodiment of an electric power system of the present invention.

FIG. 1 depicts an electric power system 10 as it would be used in an electric vehicle to provide power to an AC drive motor 12 that is coupled to the vehicle wheels through a conventional transmission (not shown). The AC motor 12 is energized using an inverter 14 that contains a number of power transistors 16 operated in a pulse-width modulated fashion by a controller 18. The power transistors 16 are connected in circuit between motor 12 and a high voltage bus 20 using a conventional drive topology 22 that permits selective energization of each of the windings of motor 12. Electric power system 10 also includes an auxiliary power circuit 24 that converts operating power provided by inverter 14 into one or more DC voltages that are used by the various auxiliary vehicle systems requiring lower voltage operating power. As will be described in greater detail further below, the operating power used by the auxiliary power circuit 24 is created by injection (23) of a high frequency signal 19 into power transistors 16, with the auxiliary power circuit being operable to rectify the high frequency output of the power transistors 16 into the desired DC voltages.

High voltage bus 20 includes positive and negative voltage nodes 28 and 30, respectively, with the positive node 28 being charged to a voltage of approximately 350–400 Vdc, as is common. It is charged by a DC supply 32 via a power relay or other contactor 34 that can be controlled by the vehicle ignition system in a conventional manner. The DC supply 32 can be, for example, a battery or fuel cell. A capacitor 36 or bank of capacitors can be connected across high voltage bus 20 for purposes of filtering and charge storage. It will of course be appreciated that high voltage bus 20 need not be at the 350–400 Vdc level; rather, within the scope of the present invention, it can be any power supply bus having a voltage that is above the DC output voltage produced by the auxiliary power circuit 24.

As illustrated, motor 12 is a three-phase AC motor that can be operated in a conventional fashion using a space vector approach, with inverter 14 being in the form of a three phase voltage source inverter that runs motor 12 at a fundamental frequency that is varied in accordance with desired motor speed. For this purpose controller 18 provides suitable PWM control 21 of motor 12 using reference and feedback values indicative of such things as commanded speed, actual speed, and other such inputs well known to those skilled in the art. Superimposed on the PWM control signals 17 that drive transistors 16 are a set of high frequency drive signals 19 that are used to transfer power to auxiliary power circuit 24 via the inverter's output 38. As a result, inverter 14 provides both lower frequency operating power for operation of motor 12 and high frequency operating power for conversion by auxiliary power circuit 24 into the desired, lower voltage DC outputs. The high frequency drive signals produced by controller 18 are at a frequency chosen high enough that operation of the motor 12 is substantially unaffected, meaning that any effect that the high frequency operating power has on operation of the motor is acceptable for the particular application in which drive motor 12 is being used.

In the embodiment illustrated in FIG. 1, auxiliary power circuit 24 has an input 26 connected directly to the output 38 of inverter 14. It is operable to convert the three-phase upper frequency operating power provided on output 38 into both 12 Vdc and 48 Vdc supplies that are then used to operate various vehicle accessory drive motors and power systems. For this purpose, auxiliary power circuit 24 includes a high-pass filter 40, power transformer 42, and rectifier 44, each of which is a three-phase circuit to accommodate the three-phase inverter output. High pass filter 40 blocks the lower frequency operating power used to drive motor 12 and therefore is designed with a cut-off frequency that is above the highest fundamental operating frequency of motor 12, but below the frequency used to generate the upper frequency operating power. Thus, controller 18 operates the drive transistors 16 at lower frequencies that are below this cut-off frequency and also operates the drive transistors at one or more upper frequencies that are above this cut-off frequency. As will be appreciated, since the motor operation is substantially unaffected by the upper frequency operating power, this arrangement results in the lower frequency operating power being used only by the drive motor to produce rotation of the motor, and the upper frequency operating power being used only by the auxiliary power circuit 24 to produce the 12 and 48 Vdc outputs.

Power transformer 42 is used as a voltage adapter and isolation transformer that includes a separate three-phase secondary for each of the different DC voltage outputs produced by auxiliary power circuit 24. Of course, it will be appreciated that other suitable winding arrangements could be used to obtain the desired transformer outputs. Transformer 42 is wound with a turns ratio appropriate for producing the secondary peak voltages desired to produce the 12 and 48 Vdc outputs. Each of the secondaries of transformer 42 is connected to rectifier 44, which can be implemented as multiple three-phase rectifiers—each having a conventional design that is used to rectify the voltage provided on a separate one of the transformer secondaries. The rectified 12 and 48 Vdc operating power is provided on a pair of DC outputs 46 and 48, respectively, for use by the various vehicle systems designed to run from these voltages.

Controller 18 can be a microprocessor-based controller operating under program control to process the various inputs and feedback values received by the controller and generate the appropriate drive signals that are outputted to transistors 16. As mentioned above, these reference and feedback values can include both desired and actual motor speed and any of a number of other variables and parameters that can be used in a well known manner to provide closed loop control of the speed and torque of motor 12. Controller 18 also provides closed loop control of the 12 and 48 Vdc outputs of rectifier 44. This can be accomplished by feeding back to controller 18 a signal indicative of one of the output voltages and then adjusting the upper frequency operating power as needed when the monitored DC voltage varies from the desired setpoint. Adjustment of the outputted DC voltages by controller 18 can be achieved by adjusting the voltage amplitude of the upper frequency operating power produced by inverter 14.

During lower speed operation of motor 12, the upper frequency used by controller 18 to transfer power to auxiliary power circuit 24 can be selected independently of the lower frequency used to drive motor 12. However, where the motor speed increases to a point near or beyond the base speed of the electric motor drive system, the voltage available for the auxiliary power circuit is reduced. In this event, controller 18 can synchronize the high frequency injection with the low frequency drive of the motor using, for example, a fifth or seventh harmonic of the lower frequency drive signal. Thus, where the inverter is operable to run the drive motor 12 within different speed ranges, it can be programmed so that, when the inverter is operating the motor in a speed range that includes the base speed, the power transistors 16 are driven at a first frequency to produce the lower frequency drive power for the motor and are also driven at a second frequency (to produce the upper frequency operating power) that is a harmonic of the first frequency.

Figure 2:
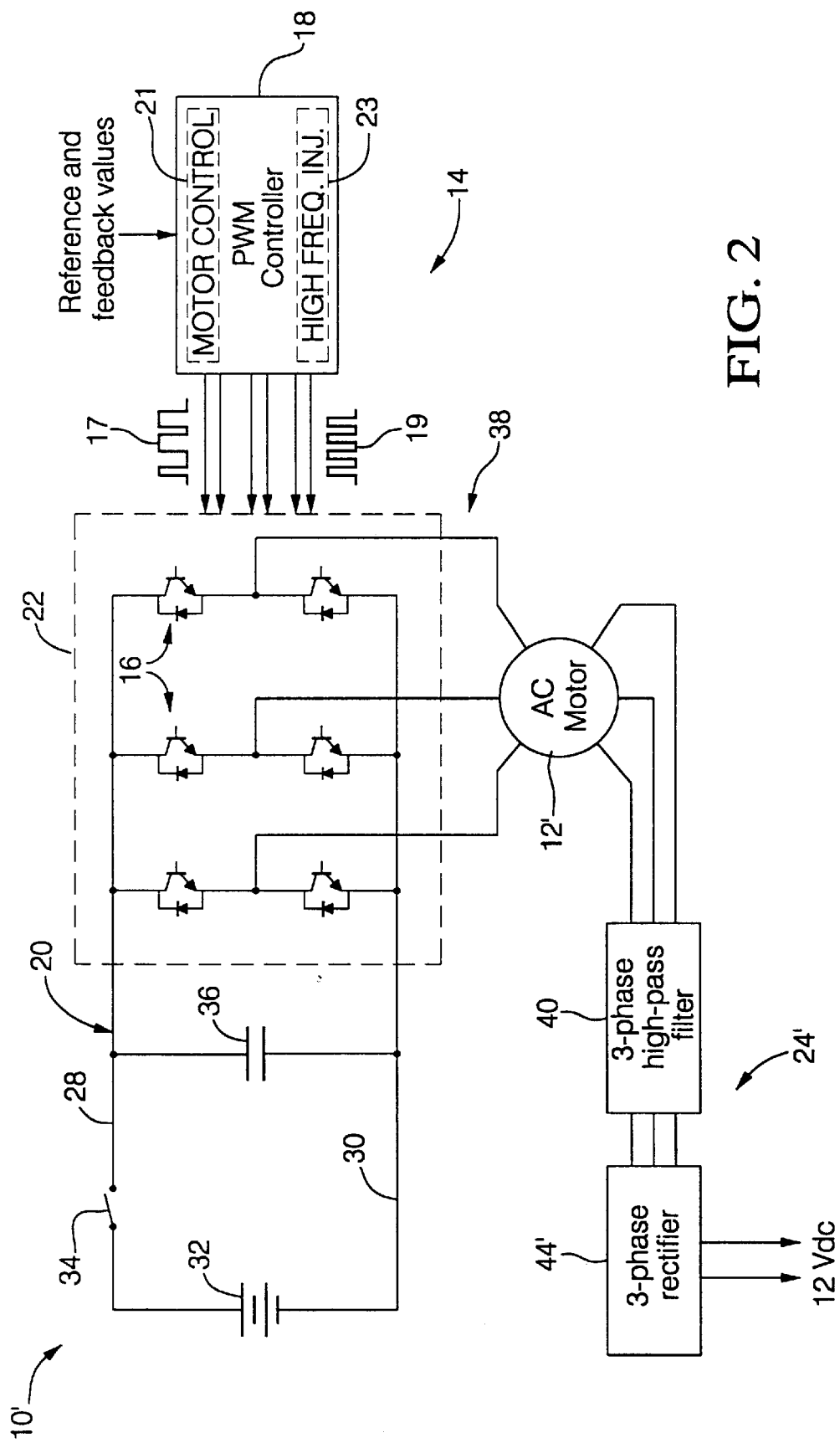
FIG. 2 is a block diagram of a second embodiment of an electric power system of the present invention.

Referring now to FIG. 2, a second embodiment of the invention will now be described. The electric power system 10' of FIG. 2 is the same as that of FIG. 1 with the exception that the power transformer 42 is eliminated by use of a dual winding motor 12' having a drive winding as in the motor 12 of FIG. 1, but also including a secondary winding which is coupled by mutual induction to the drive winding. This secondary winding on the motor 12' provides the necessary voltage step-down so that the high pass filter 40 can be connected directly to rectifier 44'. This circuit can also have the advantage that the high pass filter 40 need not be implemented with high voltage rating components since the voltage step-down takes place before filter 40. Although rectifier 44' of this embodiment only has a single 12 Vdc output, it will be appreciated that motor 12' can have additional secondary windings for other voltage outputs. All other features of the electric power system 10' of FIG. 2 can be the same as that of FIG. 1 and it will be appreciated that the discussion above of these features in connection with FIG. 1 applies equally to FIG. 2.

As should now be apparent, the circuit arrangements of FIGS. 1 and 2 eliminate the need for separate DC—DC converters operating directly off the high voltage bus by using controller 18 to inject a high frequency drive signal into the inverter's power transistors, with the auxiliary power circuit then rectifying the outputted high frequency voltage to thereby provide the desired low and/or intermediate DC voltages. This provides an economical solution to the problem of generating auxiliary power in electric vehicles for use by electric traction control motors, climate control compressor motors, liquid coolant pumps, electric power steering pumps, and other such accessory drive motors.

Furthermore, although some oversizing of the power transistors 16 may be necessary to handle the additional current required for the auxiliary power circuit, the magnitude of such oversizing is not significant. For example, the current handling capability of the power transistors can be computed according to the equation:

$$I_{sw} = \sqrt{I_{lf}^2 + I_{hf}^2}$$

where Isw is the magnitude of current that the power transistors 16 must switch, Ilf is the lower frequency current required by the motor 12, and Ihf is the upper frequency current required by the auxiliary power circuit. For a low frequency current of Ilf=300 Arms and a high frequency of Ihf=100 Arms, the total switching current that the transistors must handle is Isw=316 Arms, only 5.33% higher than the lower frequency current without the higher frequency signal injection.

Accordingly, it should thus be apparent that there has been provided in accordance with the present invention an electric power system for an electric vehicle that achieves the aims and advantages specified herein. It will of course be understood that the foregoing description is of preferred exemplary embodiments and that the invention is not limited to the specific embodiments shown. Various changes and modifications will become apparent to those skilled in the art. For example, although the auxiliary power circuit designs illustrated herein provide a fixed DC output voltage, it will be appreciated by that they could include their own PWM stage or other suitable circuitry to provide variable output voltages, particularly where their use would be dedicated to a single auxiliary vehicle system or accessory drive motor. All such changes and modifications are intended to come within the scope of the appended claims.

We claim:

1. An electric power system for an electric vehicle, comprising:

an electric drive motor;

a high voltage bus for supplying operating power to energize said drive motor;

an inverter including power switching devices and having an inverter output, wherein the inverter is coupled between the high voltage bus and the electric drive motor;

a controller coupled to the inverter and providing motor control signals and high frequency injection signals to the inverter;

an auxiliary power unit coupled to said inverter output and having a DC output for supplying a DC operating power, wherein the auxiliary power unit supplies the DC operating power in response to the high frequency injection signals;

wherein the electric drive motor operates in response to the motor control signals and is substantially unaffected by the high frequency injection signals.

2. An electric power system for an electric vehicle, comprising:

an electric drive motor;

a high voltage bus for supplying operating power to energize said drive motor;

an inverter including power switching devices and having an inverter output, wherein the inverter is coupled between the high voltage bus and the electric drive motor;

a controller coupled to the inverter and providing motor control signals and high frequency injection signals to the inverter;

an auxiliary power unit coupled to said inverter output and having a DC output for supplying a DC operating power, wherein the auxiliary power unit supplies the DC operating power in response to the high frequency injection signals;

wherein the electric drive motor operates in response to the motor control signals and is substantially unaffected by the high frequency injection signals, and wherein the electric drive motor couples the auxiliary power unit to the inverter output.

\* \* \* \* \*